(12) United States Patent
Matsumoto et al.

(10) Patent No.: US 8,009,647 B2
(45) Date of Patent: Aug. 30, 2011

(54) COMMUNICATION TERMINAL, COMMUNICATION METHOD AND COMMUNICATION PROGRAM

(75) Inventors: Fumiaki Matsumoto, Higashiosaka (JP); Mitsuhiro Sugimori, Osaka (JP); Hiroshi Tsunoda, Kadoma (JP); Hideto Matsuyama, Katano (JP)

(73) Assignee: Kyocera Corporation, Kyoto (JP)

( * ) Notice: Subject to any disclaimer, the term of this patent is extended or adjusted under 35 U.S.C. 154(b) by 887 days.

(21) Appl. No.: 11/953,393

(22) Filed: Dec. 10, 2007

(65) Prior Publication Data

US 2008/0137628 A1 Jun. 12, 2008

(30) Foreign Application Priority Data

Dec. 11, 2006 (JP) ................. 2006-333590

(51) Int. Cl.
*H04W 4/00* (2009.01)
*H04W 36/00* (2009.01)
*G08C 17/00* (2006.01)
*G06F 15/16* (2006.01)

(52) U.S. Cl. ............ 370/338; 370/311; 455/432.1; 455/436; 455/437; 709/249

(58) Field of Classification Search ............ 370/338
See application file for complete search history.

(56) References Cited

U.S. PATENT DOCUMENTS

| 7,447,165 B1 * | 11/2008 | Sylvain | 370/254 |
| 7,450,941 B2 * | 11/2008 | Lee | 455/432.1 |
| 2002/0085516 A1 * | 7/2002 | Bridgelall | 370/329 |
| 2004/0196810 A1 | 10/2004 | Kil et al. | |
| 2006/0166662 A1 | 7/2006 | Nah | |
| 2008/0032695 A1 | 2/2008 | Zhu et al. | |

FOREIGN PATENT DOCUMENTS

| CN | 1741647 | 3/2006 |
| CN | 1801998 | 7/2006 |
| JP | 2004248291 A | 9/2004 |
| KR | 10-2002-0047895 | 6/2002 |
| WO | WO 2004114707 A1 * | 12/2004 |

OTHER PUBLICATIONS

Office Action from Chinese Patent Application No. 200710196946.X, dated Jul. 26, 2010.

* cited by examiner

*Primary Examiner* — Jeffrey Pwu
*Assistant Examiner* — Jasmine Myers
(74) *Attorney, Agent, or Firm* — Morrison & Foerster LLP

(57) ABSTRACT

In order to simplify the operation during a call, a communication terminal includes: a radio circuit and a wireless LAN circuit; a flash ROM storing user identification information for identifying a target to communicate and telephone book data in which the user identification information and multiple pieces of access information respectively corresponding to the radio circuit and the wireless LAN circuit are associated with each other; and a control portion to search the telephone book data, if the wireless LAN circuit becomes incommunicable with the other party's mobile phone during communication, to extract a mobile phone number which is related with the user identification information of the user of the other party's mobile phone and corresponds to the radio circuit, and to originate a call to the other party's mobile phone by the radio circuit using the extracted mobile phone number.

15 Claims, 8 Drawing Sheets

F I G. 1
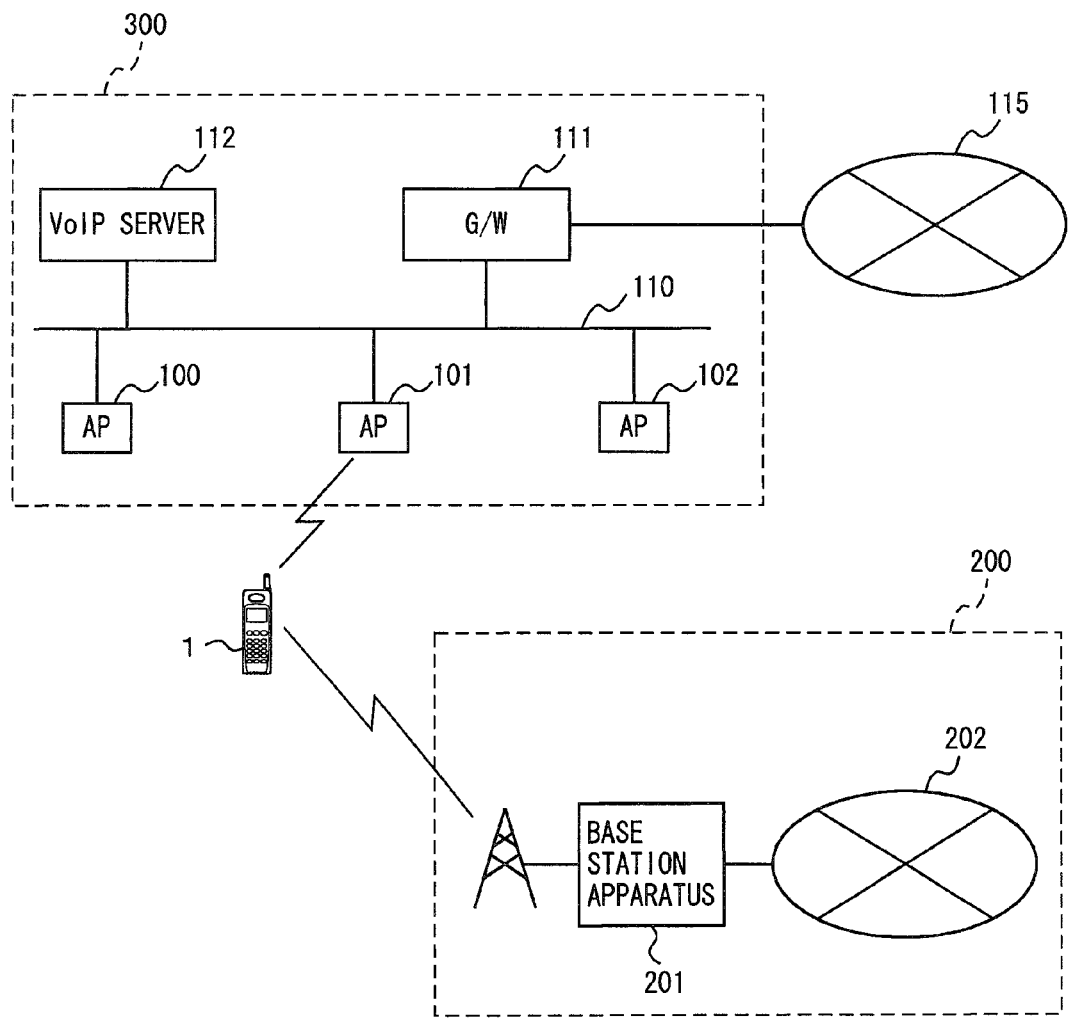

F I G. 4

| | NAME (USER IDENTIFICATION INFORMATION) / THE OTHER PARTY INFORMATION | YAMADA | TANAKA | NAKAYAMA |
|---|---|---|---|---|
| MOBILE NETWORK | MOBILE PHONE NUMBER | 090-1111-1111 | 090-2222-2222 | |
| | MESSAGE ADDRESS | aaa@cellular.com | bbb@cellular.com | |
| WIRELESS LAN | EXTENSION NUMBER | 050-1111-1111 | 050-2222-2222 | 050-3333-3333 |
| | EMAIL ADDRESS | aaa@wlan.com | bbb@wlan.com | ccc@wlan.com |

COMMUNICATION TERMINAL, COMMUNICATION METHOD AND COMMUNICATION PROGRAM

This application is based on Japanese Patent Application No. 2006-333590 filed with Japan Patent Office on Dec. 11, 2006, the entire content of which is hereby incorporated by reference.

BACKGROUND OF THE INVENTION

1. Field of the Invention

The present invention relates to a communication terminal, a communication method and a communication program, and more particularly to a communication terminal connectable to an IP network, a communication method executed in the communication terminal and a communication program.

2. Description of the Related Art

In recent years, IP telephones using IP (Internet Protocol) network such as the Internet in place of a public telephone network have emerged. IP network can be realized by a local area network using wireless communications (referred to as "wireless LAN" hereinafter). A mobile phone such as PDC (Personal Digital Cellular) or PHS (Personal Handyphone System) equipped with a communication circuit adapted to such a wireless LAN can be used as an IP telephone.

On the other hand, when a mobile phone is used as an IP phone, a wireless LAN (Local Area Network) using a radio wave as a communication medium is generally employed. Since the communicable range of the wireless LAN is relatively narrow, a user carrying a mobile phone cannot maintain the communication when moving outside the range where communication can be established.

Conventionally, a wireless phone device is known in which when identification means identifies that the device is out of service, a telephone number is input by operation means, so that said telephone number is stored in storage means, and when the identification means identifies that the device is in service after moving, call originating control means controls such that call originating means automatically makes a call to the telephone number stored in said storage means.

However, even with the conventional technique, a call cannot be established when a mobile phone is located outside the range of the wireless LAN. Even when the phone is located outside the range of the wireless LAN, if it is located within the communication range of the mobile phone, a call can be established using the mobile phone network. However, in order to connect to the mobile phone network, a user has to input the other party's telephone number or select it from a telephone book, which complicates the operation.

SUMMARY OF THE INVENTION

In accordance with an aspect of the present invention, in order to simplify the operations during a call, a communication terminal includes: different kinds of communication portions; a storage portion to store an address table in which target identification information for identifying a target to communicate and multiple pieces of access information respectively corresponding to the different kinds of communication portions are associated with each other; an extraction portion to search the address table, if a first communication portion of the different kinds of communication portions becomes incommunicable during communication with a communication target, and to extract access information which is related with the target identification information for identifying the communication target and corresponds to a second communication portion different from the first communication portion of the different kinds of communication portions; and a reconnection portion to transmit a connection request to the communication target by the second communication portion using the extracted access information.

In accordance with another aspect of the present invention, a communication method is executed in a communication terminal. The communication terminal includes different kinds of communication portions and a storage portion to store an address table in which target identification information for identifying a target to communicate and multiple pieces of access information respectively corresponding to the different kinds of communication portions are associated with each other. The communication method includes the steps of: searching the address table, if a first communication portion of the different kinds of communication portions becomes incommunicable during communication with a communication target, and extracting access information which is related with the target identification information for identifying the communication target and corresponds to a second communication portion different from the first communication portion of the different kinds of communication portions; and transmitting a connection request to the communication target by the second communication portion using the extracted access information.

In accordance with a further aspect of the present invention, a communication program is executed in a computer which controls a communication terminal. The communication terminal includes different kinds of communication portions and a storage portion to store an address table in which target identification information for identifying a target to communicate and multiple pieces of access information respectively corresponding to the different kinds of communication portions are associated with each other. The communication program includes the steps of: searching the address table, if a first communication portion of the different kinds of communication portions becomes incommunicable during communication with a communication target, and extracting access information which is related with the target identification information for identifying the communication target and corresponds to a second communication portion different from the first communication portion of the different kinds of communication portions; and transmitting a connection request to the communication target by the second communication portion using the extracted access information.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing an overview of a communication system in the present embodiment.

FIG. 4 is a diagram showing an example of telephone book data.

DESCRIPTION OF THE PREFERRED EMBODIMENT

Figure 2A:
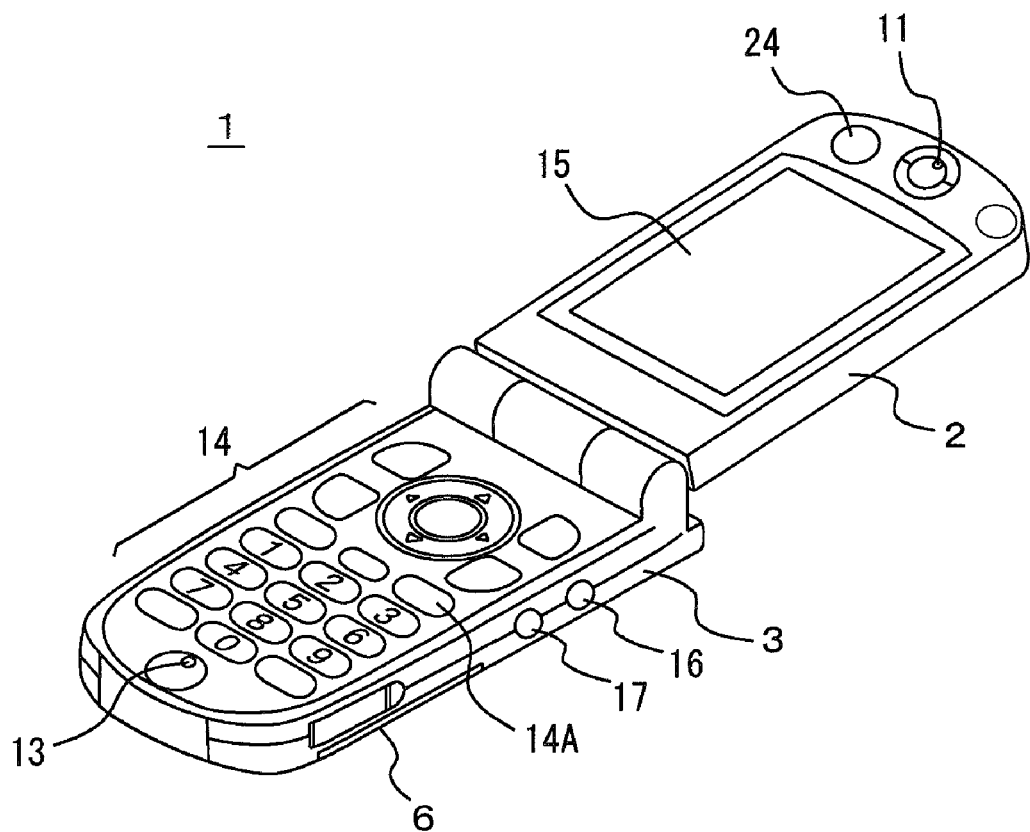
FIG. 2A and FIG. 2B are external perspective views of a mobile phone in an embodiment of the present invention.

In the following, an embodiment of the present invention will be described with reference to the figures. In the following description, the same parts will be denoted with the same reference characters. Their designations and functions are also the same. Therefore, detailed description thereof will not be repeated.

FIG. 1 is a diagram showing an overview of a communication system in the present embodiment. Referring to FIG. 1, a communication system 10 includes a mobile phone system 200 and a wireless LAN system 300. Mobile phone system 200 is a system provided by a carrier and here includes, as an example, a communication network 202, a base station apparatus 201 connected to the communication network 202, and a mobile phone 1 as a communication terminal wirelessly communicating with base station apparatus 201. Here, for the sake of illustration, one base station apparatus 201 is shown. However, the number of base station apparatuses is not limited as long as there are one or more. Base station apparatus 201 is a radio station apparatus which functions as a repeater of communication network 202. When located in a communicable range of base station apparatus 201, mobile phone 1 wirelessly communicates with base station apparatus 201 to be connected to communication network 202. Here, communication network 202 provided by a carrier is called a first network (mobile network).

Wireless LAN system 300 includes mobile phone 1, three access points (AP) 100-102, a VoIP (Voice over Internet Protocol) server 112, and a gateway (G/W) 111. AP 100-102, VoIP server 112, and G/W 111 are each connected to a LAN cable 110 and constitute a second network (wireless LAN) over which data can be communicated with each other. Here, for the sake of illustration, three access points 100-102 are shown. However, the number of access points is not limited as long as there are one or more. Access points 100-102 are radio station apparatuses each functioning as a repeater in LAN. Mobile phone 1 can wirelessly communicate with any one of access points 100-102, and when wirelessly communicating with any one of access points 100-102, mobile phone 1 is connected to the wireless LAN to be able to communicate with VoIP server 112 and G/W 111.

The wireless LAN is connected to the Internet 115 through G/W 111. Therefore, mobile phone 1 can communicate with any other communication terminal connected to the Internet 115 while being connected to the wireless LAN.

VoIP server 112 mediates between mobile phone 1 and the other party's device each connected to the second network. The other party's device includes a computer connected to the second network, an IP phone and another mobile phone communicating with any one of access points 100-102. VoIP server 112 stores beforehand a user table in which apparatus identification information for identifying mobile phone 1 and an extension number assigned beforehand to that mobile phone 1 are associated with each other, and when mobile phone 1 is connected to the wireless LAN, VoIP server 112 associates the IP address assigned to mobile phone 1 with the extension number assigned to mobile phone 1. For example, a case where first apparatus identification information and a first extension number are assigned to a first mobile phone and second apparatus identification information and a second extension number are assigned to a second mobile phone will be described. When the first mobile phone is connected to the second network, a first IP address is assigned thereto by a DHCP (Dynamic Host Configuration Protocol) server and the first mobile phone obtains the first IP address from the DHCP server. Thereafter, when the first mobile phone makes a registration request to VoIP server 112 for the first IP address, VoIP server 112 associates the first extension number with the first IP address. Similarly, when the second mobile phone is connected to the second network, a second IP address is assigned thereto by the DHCP server and the second mobile phone obtains the second IP address from the DHCP server. Thereafter, when the second mobile phone makes a registration request to VoIP server 112 for the second IP address, VoIP server 112 associates the second extension number with the second IP address. The first mobile phone 1 transmits the second extension number to VoIP server 112, so that the VoIP server mediates between the first and second mobile phones to enable communication of IP packet between the first and second mobile phones. Thus, each of the first and second mobile phones functions as an IP phone, thereby enabling a call. Furthermore, the first mobile phone may transmit the second extension number to VoIP server 112 and obtain the second IP address assigned to the second mobile phone from VoIP server 112, so that IP packet is communicated directly between the first mobile phone and the second mobile phone.

Figure 2B:
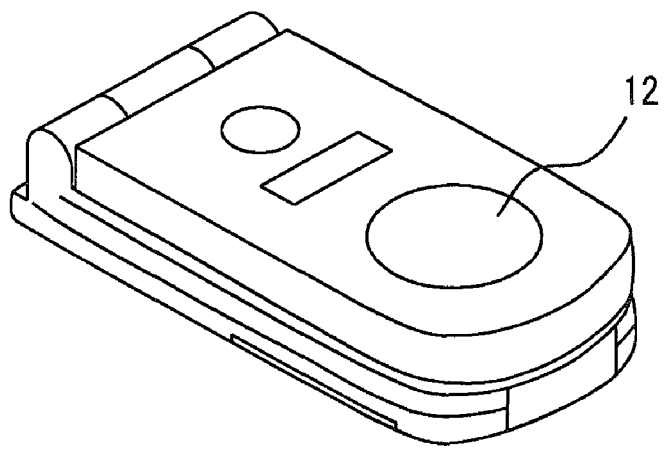

FIG. 2A and FIG. 2B are external perspective views of a mobile phone in an embodiment of the present invention. FIG. 2A shows an external view of a mobile phone in an open style and FIG. 2B shows an external view of a mobile phone in a closed style. Referring to FIG. 2A and FIG. 2B, mobile phone 1 includes an operation-side portion 3 and a display-side portion 2. Operation-side portion 3 includes a power key 14A, operation keys 14 including ten keys, a call key and the like, and a microphone 13 on the inner surface thereof, and includes a microphone terminal 16 and an earphone terminal 17 on the right side surface thereof. Display-side portion 2 includes a liquid crystal display (LCD) 15, a first speaker 11 as a receiver, and a camera 24 on the inner side surface thereof, and includes a second speaker 12 on the outer surface thereof. Although here mobile phone 1 includes LCD 15 by way of example, LCD 15 may be replaced by an organic EL (Electro Luminescence) display. Operation-side portion 3 and display-side portion 2 are rotatably jointed to each other with a hinge mechanism so that operation-side portion 3 and display-side portion 2 can be opened and closed freely. When mobile phone 1 is folded and operation-side portion 3 and display-side portion 2 are in the closed state, mobile phone 1 is in the closed style. When mobile phone 1 is opened and operation-side portion 3 and display-side portion 2 are in the open state, mobile phone 1 is in the open style.

Figure 3:
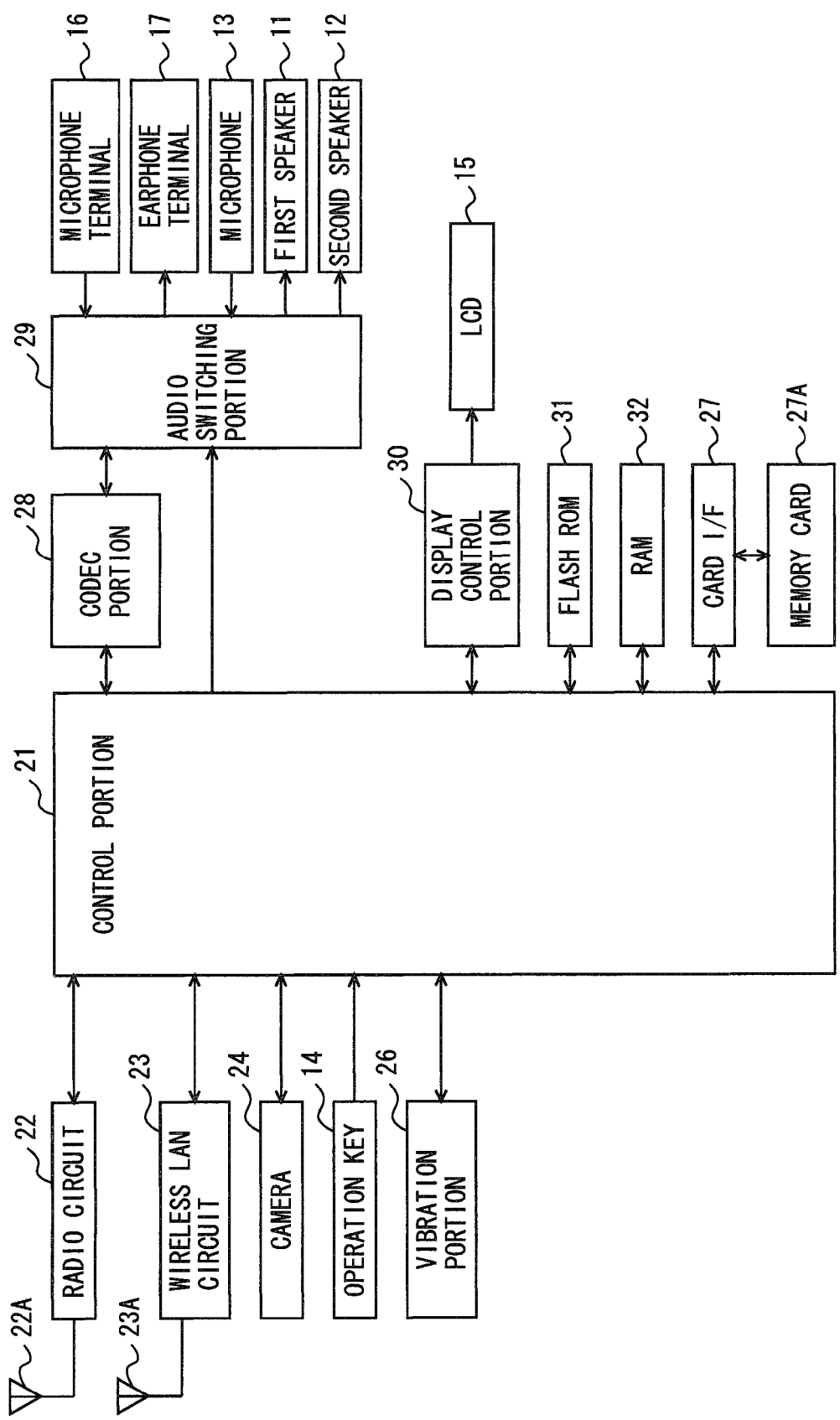
FIG. 3 is a functional block diagram showing an exemplary function of the mobile phone in the present embodiment.

FIG. 3 is a functional block diagram showing an exemplary function of the mobile phone in the present embodiment. Referring to FIG. 3, mobile phone 1 includes a control portion 21 for controlling the entire mobile phone 1, a radio circuit 22 connected to an antenna 22A, a wireless LAN circuit 23 connected to an antenna 23A, a codec portion 28 for processing audio data, an audio switching portion 29 for switching input/output of codec portion 28, microphone 13, first speaker 11, second speaker 12, microphone terminal 16 and earphone terminal 17, each connected to audio switching portion 29, camera 24, operation keys 14 accepting an input of an operation by a user, a vibration portion 26, a display control portion 30 for controlling display on LCD 15, a flash ROM (Read Only Memory) 31 for storing a program executed in control portion 21, address book data, emails and the like, an RAM (Random Access Memory) 32 for use as a work area for control portion 21, and a card interface (I/F) 27.

Radio circuit 22 is controlled by control portion 21 and wirelessly communicates with base station apparatus 201 connected to communication network 202. A radio signal transmitted by base station apparatus 201 from an antenna is received by antenna 22A. Radio circuit 22 receives a radio signal received by antenna 22A and outputs an audio signal demodulated from the radio signal to codec portion 28. Furthermore, radio circuit 22 receives an audio signal from codec portion 28 and outputs a radio signal modulated from the audio signal to antenna 22A. The radio signal transmitted from antenna 22A is received by the antenna of base station apparatus 201 and output to base station apparatus 201.

Wireless LAN circuit 23 is controlled by control portion 21 and wirelessly communicates with any one of access points 100-102. A radio signal transmitted by any one of access points 100-102 is received by antenna 23A. Wireless LAN circuit 23 receives a radio signal received by antenna 23A and outputs an audio signal demodulated from the radio signal to codec portion 28. Furthermore, wireless LAN circuit 23 receives an audio signal from codec portion 28 and outputs a radio signal modulated from the audio signal to antenna 23A. The radio signal transmitted from antenna 23A is received by any one of access points 100-102. Communication between wireless LAN circuit 23 and each of access points 100-102 may use an electromagnetic wave as a communication medium or may use infrared radiation or the like as a communication medium.

Codec portion 28 decodes an audio signal input from radio circuit 22 or wireless LAN circuit 23, converts the decoded digital audio signal into an analog signal, amplifies the analog signal, and then outputs the amplified signal to audio switching portion 29. In addition, codec portion 28 receives an analog audio signal from microphone 13 or microphone terminal 16 through audio switching portion 29, converts the audio signal into a digital signal, encodes the digital signal, and then outputs the encoded audio signal to radio circuit 22 or wireless LAN circuit 23.

Audio switching portion 29 is controlled by control portion 21 to switch input/output of an audio signal to codec portion 28. Audio switching portion 29 outputs the audio signal accepted from codec portion 28 to one of earphone terminal 17, first speaker 11 and second speaker 12. When an earphone is connected to earphone terminal 17, the audio signal accepted from codec portion 28 is output to earphone terminal 17. When an earphone is not connected to earphone terminal 17, if mobile phone 1 is in a hands-free mode, the audio signal accepted from codec portion 28 is output to second speaker 12, and if mobile phone 1 is not in a hands-free mode, the audio signal accepted from codec portion 28 is output to first speaker 11. Mobile phone 1 is set in the hands-free mode by a user operating operation key 14. When mobile phone 1 is in a call state in the open style, even if the hands-free mode is not set, control portion 21 sets the hands-free mode when the state of mobile phone 1 changes to the closed style. Therefore, if the hands-free mode is not set when mobile phone 1 is in a call state in the open style, audio switching portion 29 outputs the audio signal accepted from codec portion 28 to first speaker 11, and when the state of mobile phone 1 changes to the closed style, audio switching portion 29 outputs the audio signal accepted from codec portion 28 to second speaker 12.

Audio switching portion 29 outputs an audio signal output by microphone 13 or microphone terminal 16 to codec portion 28. When a microphone is connected to microphone terminal 16, audio switching portion 29 outputs the audio signal accepted from microphone terminal 16 to codec portion 28, and when a microphone is not connected to microphone terminal 16, audio switching portion 29 outputs the audio signal accepted from microphone 13 to codec portion 28.

Display control portion 30 is controlled by control portion 21 and controls LCD 15 according to an instruction input from control portion 21 to cause an operation window or an image to appear on LCD 15. Images appearing on LCD 15 include moving images and still images.

A removable memory card 27A is attached to card I/F 27. Memory card 27A is, for example, Compact Flash, Smart Media (R), an SD (Secure Digital) memory card, a memory stick, MMC (Multi Media Card), an xD picture card, or the like.

Vibration portion 26 is controlled by control portion 21 and generates vibration by rotating a vibration plate fixed to a motor shaft at a position different from the center of gravity. Control portion 21 drives vibration portion 26 to execute an incoming call notification operation by vibration, for example, when an incoming call signal is received at radio circuit 22 or wireless LAN circuit 23.

Control portion 21 can access memory card 27A through card I/F 27. Although, in this example, a program to be executed in control portion 21 is stored in flash ROM 31, the program may be stored in memory card 27A and may be read from memory card 27A to be executed in control portion 21. A recording medium for storing a program is not limited to memory card 27A and may be a flexible disk, a cassette tape, an optical disk (CD-ROM (Compact Disc-ROM)/MO (Magnetic Optical Disc)/MD (Mini Disc)/DVD (Digital Versatile Disc)), an optical card, a semiconductor memory such as a mask ROM or EPROM, or the like. Alternatively, mobile phone 1 may be connected to the Internet via radio circuit 22 or wireless LAN circuit 23 so that a program is downloaded from the computer connected to the Internet and is then executed in control portion 21. Programs referred to herein include not only a program directly executable by control portion 21 but a source program, a compressed program, an encrypted program, and the like.

Camera 24 includes a lens and an optoelectronic transducer such as a CMOS (Complementary Metal Oxide Semiconductor) sensor to focus light collected by the lens onto the CMOS sensor. The CMOS sensor then optoelectronically converts the received light and outputs image data to control portion 21. Camera 24 is controlled by control portion 21 and starts picking up an image on an instruction from control portion 21 to output the obtained still image data or moving image data to control portion 21. Camera 24 includes an image processing circuit performing image processing for improving the image quality of image data and an A/D converter circuit converting image data from analog to digital. Control portion 21 outputs the still image data or moving image data output by camera 24 to display control portion 30 for display on LCD 15 or encodes the still image data or moving image data in a compression encoding scheme for storage into flash ROM 31 or memory card 27A attached to card I/F 27. Camera 24 picks up an image of the user of mobile phone 1 when mobile phone 1 functions as a television phone.

In mobile phone 1 in the present embodiment, telephone book data (address table) is stored in flash ROM 31. FIG. 4 is a diagram showing an example of telephone book data. Referring to FIG. 4, the telephone book data associates a name for identifying the other party of a call (user identification information), a mobile phone number allotted in the mobile network, and an extension number allotted in the wireless LAN network, with each other. In addition, the telephone book data associates the name of the other party of a call (user identification information), a message address for transmitting data by Short Service Message (SMS) in the mobile network, and an email address allocated in the wireless LAN network for transmitting data by an email, with each other. It is noted that either the mobile phone number or the extension number may be included. For example, for the user identification information "Nakayama," the extension number allotted in the wireless LAN network and the email address for transmitting data by an email in the wireless LAN network are associated with each other, while the mobile phone number allotted in the mobile network and the message address for transmitting data by Short Message Service (SMS) in the mobile network are not associated.

Figure 5:
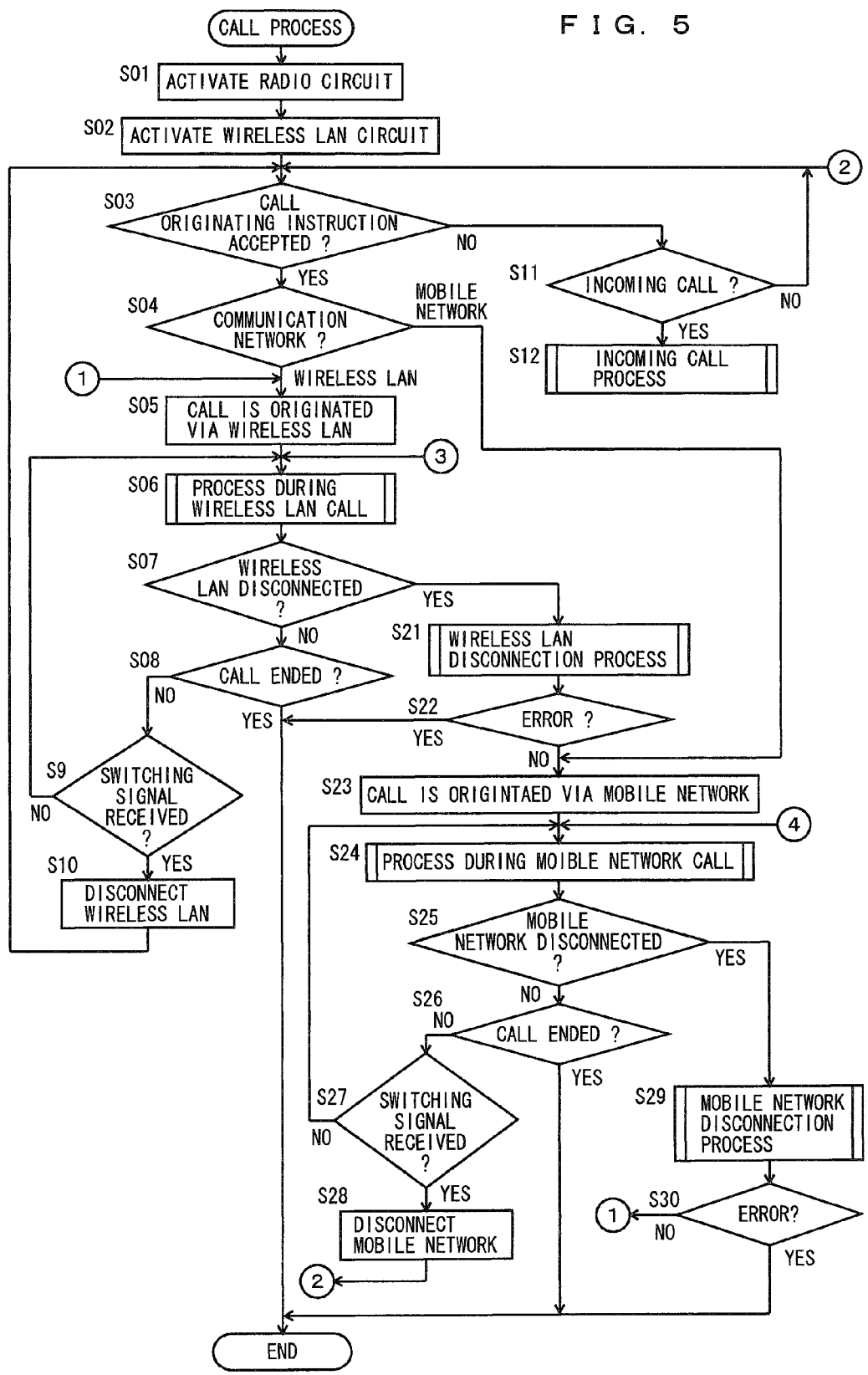
FIG. 5 is a flowchart showing an example of a call process executed in a control portion.

FIG. 5 is a flowchart showing an exemplary call process executed in the control portion. The call process is a process executed by control portion 21 executing a program stored in flash ROM 31. The call process is executed by control portion 21 when mobile phone 1 is powered on. Referring to FIG. 5, after the power is turned on, control portion 21 starts power supply to radio circuit 22 and activates radio circuit 22 (step S01). Accordingly, radio circuit 22 searches for base station apparatus 201 (which is called 1× search), and enters a standby state if mobile phone 1 is present in a range communicable with base station apparatus 201. Next, power supply to wireless LAN circuit 23 is started and wireless LAN circuit 23 is activated (step S02). Thus, wireless LAN circuit 23 searches for any one of access points 100, 101, 102, and enters a standby state if mobile phone 1 is present in a range communicable with any one of access points 100, 101, 102. Furthermore, in wireless LAN circuit 23, for example, a browser program for viewing a Web page, a navigation program, a program for transmitting/receiving and editing emails, a file download program, or the like is executed by control portion 21 so that communication is executed by wireless LAN circuit 23.

In step S03, it is determined whether or not a call originating instruction is accepted. If a call originating instruction is accepted, the process proceeds to step S04, and if not, the process proceeds to step S11. The call originating instruction includes selection of a communication network and selection of a called number. The user of mobile phone 1 operates an operation key to select any one of the mobile network and the wireless LAN and then inputs an extension number or a mobile phone number, so that control portion 21 accepts the call originating instruction. Alternatively, the telephone book data may be read from flash ROM 31 and displayed in a list on LCD 15 and the user may operate operation key 14 to select one from the listed extension numbers and mobile phone numbers. If an extension number is selected, the wireless LAN is selected, and if a mobile phone number is selected, the mobile network is selected.

In step S04, the process branches depending on the communication network selected in the call originating instruction accepted in step S03. If the wireless LAN is selected, the process proceeds to step S05, and if the mobile network is selected, the process proceeds to step S23. In step S05, a call is originated via the wireless LAN. Specifically, wireless LAN circuit 23 is allowed to transmit an outgoing call signal. The outgoing call signal includes the extension number included in the call originating instruction accepted in step S03. In the next step S06, a process during a wireless LAN call is executed. The process during a wireless LAN call, which will be detailed later, is a process of determining whether connection of the line is to be maintained or cut off, depending on the state of the line of the wireless LAN. In step S07, the process branches depending on the result of the process during a wireless LAN call. If it is determined that the line is to be disconnected, the process proceeds to step S21, and if it is determined that the line is to be maintained, the process proceeds to step S08.

In step S08, it is determined whether or not the call is ended. If the call is not ended, the process proceeds to step S09. If ended, the process ends. It is determined that the call is ended if the user presses operation key 14 to end the call or if a line disconnection instruction is received from the wireless LAN. In step S09, it is determined whether or not a switching signal is received. Here, it is determined whether or not radio circuit 22 receives a switching signal. The switching signal will be described later. If a switching signal is received in step S09, when the other party's mobile phone with which communication has been established becomes incommunicable via the wireless LAN, the switching signal is transmitted via the mobile network by the mobile phone of the other party and is then received by radio circuit 22 of mobile phone 1. If the switching signal is received, the process proceeds to step S10, and if not received, the process returns to step S06.

In step S10, the line of the wireless LAN is disconnected, and the process returns to step S03. If the process returns to step S03, control portion 21 allows wireless LAN circuit 23 to start a search operation of searching for access points 100, 101, 102 and brings radio circuit 22 into a standby state.

On the other hand, in step S21, a wireless LAN disconnection process is executed. The wireless LAN disconnection process, which will be detailed later, is a process of determining whether or not connection of the line via the mobile network can be established with the other party's mobile phone with which the line has been connected via the wireless LAN. The process result of the wireless LAN disconnection process is an error if the connection of the line via the mobile network cannot be established. In the next step S22, it is determined whether or not the process result of the wireless LAN disconnection process is an error. If the process result of the wireless LAN disconnection process is an error, a call cannot be established either via the wireless LAN or the mobile network, and the call process then ends. If not, the process proceeds to step S23.

In step S23, in order to connect the line via the mobile network, a call is originated to the mobile phone number of the other party's mobile phone with which a call has been established via the wireless LAN. Specifically, radio circuit 22 is allowed to transmit an outgoing call signal. The outgoing call signal includes the mobile phone number obtained in the wireless LAN disconnection process executed in step S21. It is noted that if the process proceeds from step S04 to step S23, radio circuit 22 is allowed to transmit an outgoing call signal including the mobile phone number included in the call originating instruction in step S23.

In the next step S24, a process during a mobile network call is executed. The process during a mobile network call, which will be detailed later, is a process of determining whether or not the line is to be maintained or disconnected depending on the state of the line of the mobile network. In step S25, the process branches depending on the result of the process during a mobile network call. If it is determined that the line is to be disconnected, the process proceeds to step S29, and if it is determined that the line of the mobile network is to be maintained, the process proceeds to step S26.

In step S26, it is determined whether or not the call is ended. If the call is not ended, the process proceeds to step S27, and if ended, the call process ends. It is determined that the call is ended if the user presses operation key 14 to end the call or if a line disconnection instruction is received from the mobile network. In step S27, it is determined whether or not a switching signal is received. Here, it is determined whether or not wireless LAN circuit 23 receives a switching signal. The switching signal will be described later. If the switching signal is received in step S24, when the other party's mobile phone with which a call has been established becomes incommunicable via the mobile network, the switching signal transmitted by the other party's mobile phone via the wireless LAN is received by wireless LAN circuit 23 of mobile phone 1. If the switching signal is received, the process proceeds to step S28, and if not received, the process returns to step S24.

In step S28, the line of the mobile network is disconnected, and the process returns to step S03. If the process returns to step S03, control portion 21 allows radio circuit 22 to start the 1× search operation and brings wireless LAN circuit 23 into a standby state.

On the other hand, in step S29, a mobile network disconnection process is executed. The mobile network disconnection process, which will be detailed later, is a process of determining whether or not the connection of the line via the wireless LAN can be established with the other party's mobile phone 1 with which the line has been connected via the mobile network. The process result of the mobile network disconnection process is an error if connection of the line via the wireless LAN cannot be established. In step S30, it is determined whether or not the process result of the mobile network disconnection process is an error. If the process result of the mobile network disconnection process is an error, a call cannot be established either via the wireless LAN or the mobile network, and the call process then ends. If not, the process returns to step S06.

Figure 6:
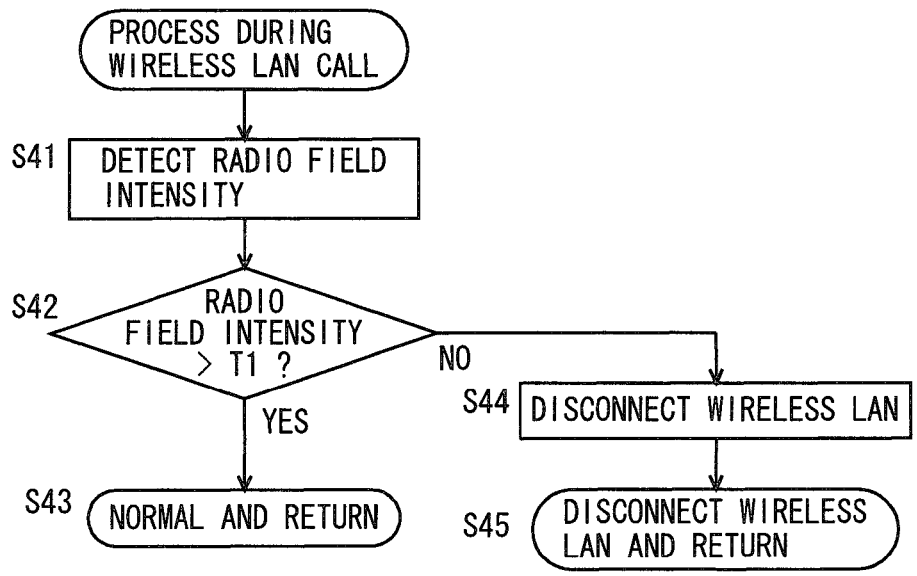
FIG. 6 is a flowchart showing an exemplary flow of a process during a wireless LAN call.

FIG. 6 is a flowchart showing an exemplary flow of the process during a wireless LAN call. The process during a wireless LAN call is a process executed in step S06 in FIG. 5. Referring to FIG. 6, the radio field intensity of a radio wave received by wireless LAN circuit 23 is detected (step S41). In the next step S42, it is determined whether or not the detected radio field intensity is greater than a predetermined threshold value T1. If the radio field intensity is greater than threshold value T1, the process proceeds to step S43. If not, the process proceeds to step S44. In step S43, the return value is set to "normal," and the process returns to the call process.

In step S44, the line established via the wireless LAN is disconnected, and the process proceeds to step S45. In step S45, the return value is set to "wireless LAN disconnected," and the process returns to the call process.

When the radio field intensity of the radio wave received by wireless LAN circuit 23 becomes weak, a call cannot be established. Therefore, the line connected via the wireless LAN for continuing a call is maintained during the strong radio field intensity, and as the radio field intensity becomes weak, the line connected via the wireless LAN is disconnected. Although here whether a call can be established or not is determined using a radio field intensity, whether a call can be established or not may be determined depending on whether a beacon sent by each of access points 100, 101, 102 can be received or not. Alternatively, whether a call can be established or not may be determined by comparing the error bit rate with a threshold value.

Figure 7:
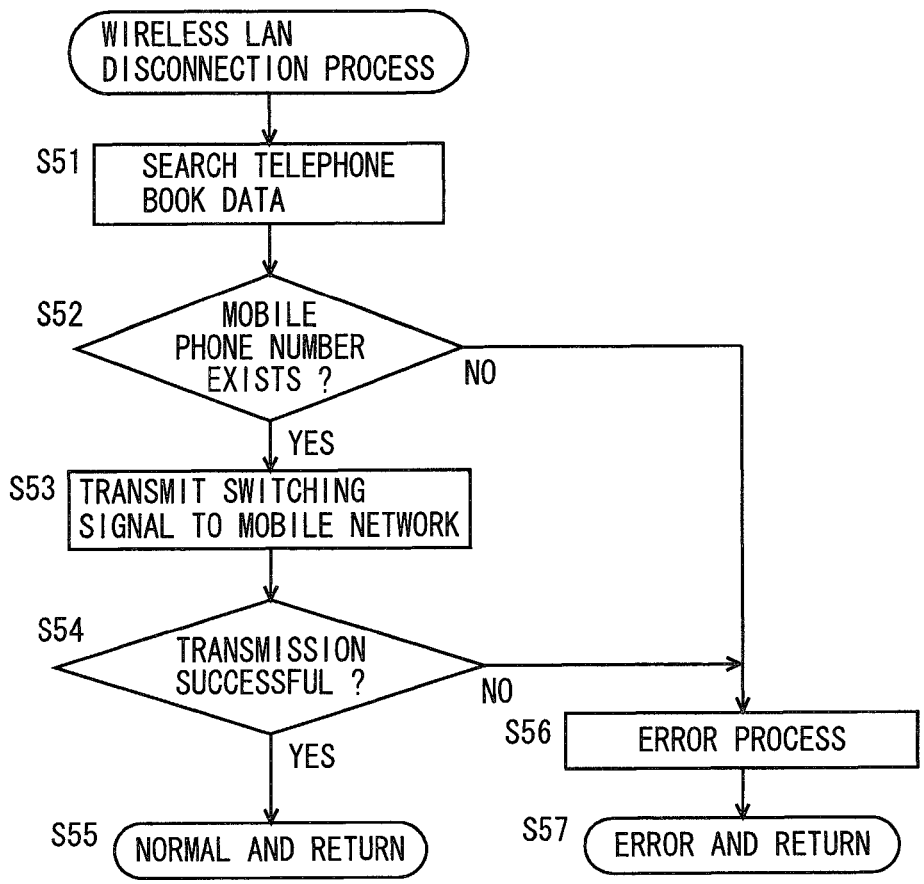
FIG. 7 is a flowchart showing an exemplary flow of a wireless LAN disconnection process.

FIG. 7 is a flowchart showing an exemplary flow of the wireless LAN disconnection process. The wireless LAN disconnection process is a process executed in step S21 in FIG. 5. Referring to FIG. 7, the telephone book data is searched (step S51). When the wireless LAN disconnection process is executed, mobile phone 1 has been connected with the other party's mobile phone via the wireless LAN until then. Therefore, using as a key the extension number allotted to the other party's mobile phone in the wireless LAN, the mobile phone number allotted in the mobile network is obtained. Specifically, using as a key the extension number allotted to the other party's mobile phone in the wireless LAN, the telephone book data stored in flash ROM 31 is searched and the telephone book data is then extracted.

In the next step S52, it is determined whether or not the mobile phone number allotted to the other party's mobile phone in the mobile network exists. Specifically, it is determined whether or not the telephone book data including the extension number is extracted, and if extracted, it is then determined whether or not a mobile phone number is defined in the extracted telephone book data. If the telephone book data is not extracted, the process proceeds to step S56. If the telephone book data is extracted, and if a mobile phone number is defined in the extracted telephone book data, the process proceeds to step S53, and if a mobile phone number is not defined, the process proceeds to step S56.

In step S53, a switching signal is transmitted to the mobile network. Specifically, a message including a switching signal is generated, and the message is transmitted to the message address defined in the telephone book data extracted in step S52. The switching signal includes an instruction to allow the other party's mobile phone to disconnect the line established via the wireless LAN and make a transition to a standby state. Since the switching instruction is transmitted before a call is originated to the mobile phone network with the mobile phone number, the other party's mobile phone does not stay in the state in which the line established via the wireless LAN is connected and enters the standby state in which it can respond to the next outgoing call originated by mobile phone 1.

In the next step S54, it is determined whether or not transmission of the switching signal is successful. If the transmission is successful, the process proceeds to step S55, and if the transmission is failed, the process proceeds to step S56. In step S55, the return value is set to "normal," and the process returns to the call process.

In step S56, an error process is executed, and the process proceeds to step S57. If a message cannot be transmitted, a line cannot be established in the mobile network, and the call is therefore ended. The error process is a process of displaying a message on LCD 15 to notify the user that a call cannot be established. In step S57, the return value is set to "error message," and the process returns to the call process.

Figure 8:
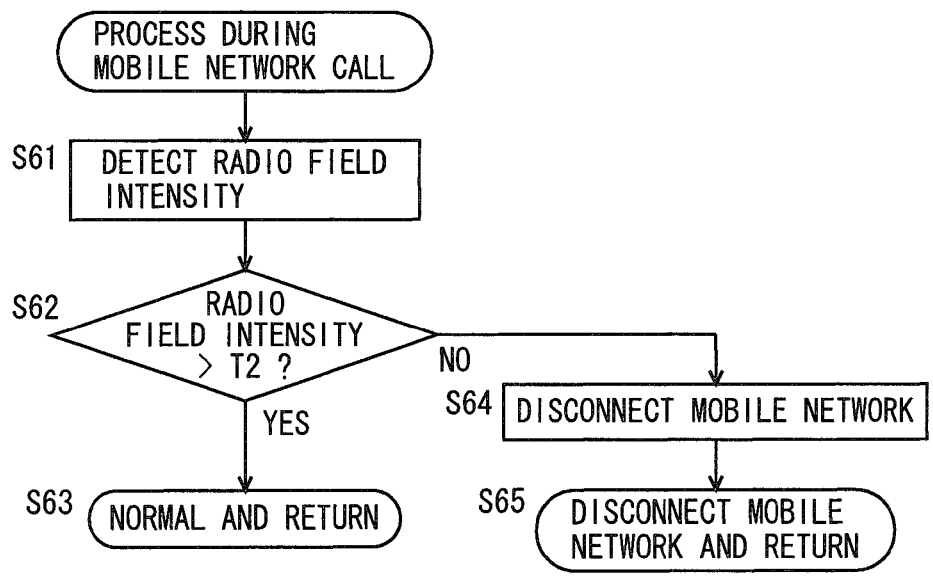
FIG. 8 is a flowchart showing an exemplary flow of a process during a mobile network call.

FIG. 8 is a flowchart showing an exemplary flow of the process during a mobile network call. The process during a mobile network call is a process executed in step S24 in FIG. 5. Referring to FIG. 8, the radio field intensity of a radio wave received by radio circuit 22 is detected (step S61). In the next step S62, it is determined whether or not the detected radio field intensity is greater than a predetermined threshold value T2. If the radio field intensity is greater than threshold value T2, the process proceeds to step S63. If not, the process proceeds to step S64. In step S63, the return value is set to "normal," and the process returns to the call process.

In step S64, the line established via the mobile network is disconnected, and the process proceeds to step S65. In step S65, the return value is set to "mobile network disconnected," and the process returns to the call process.

When the radio field intensity of the radio wave received by radio circuit 22 becomes weak, a call cannot be established. Therefore, the line established via the mobile network for continuing a call is maintained during the strong radio field intensity, and as the radio field intensity becomes weak, the line connected via the mobile network is disconnected. Although here whether a call can be established or not is determined using a radio field intensity, whether a call can be established or not may be determined by comparing the error bit rate with a threshold value.

Figure 9:
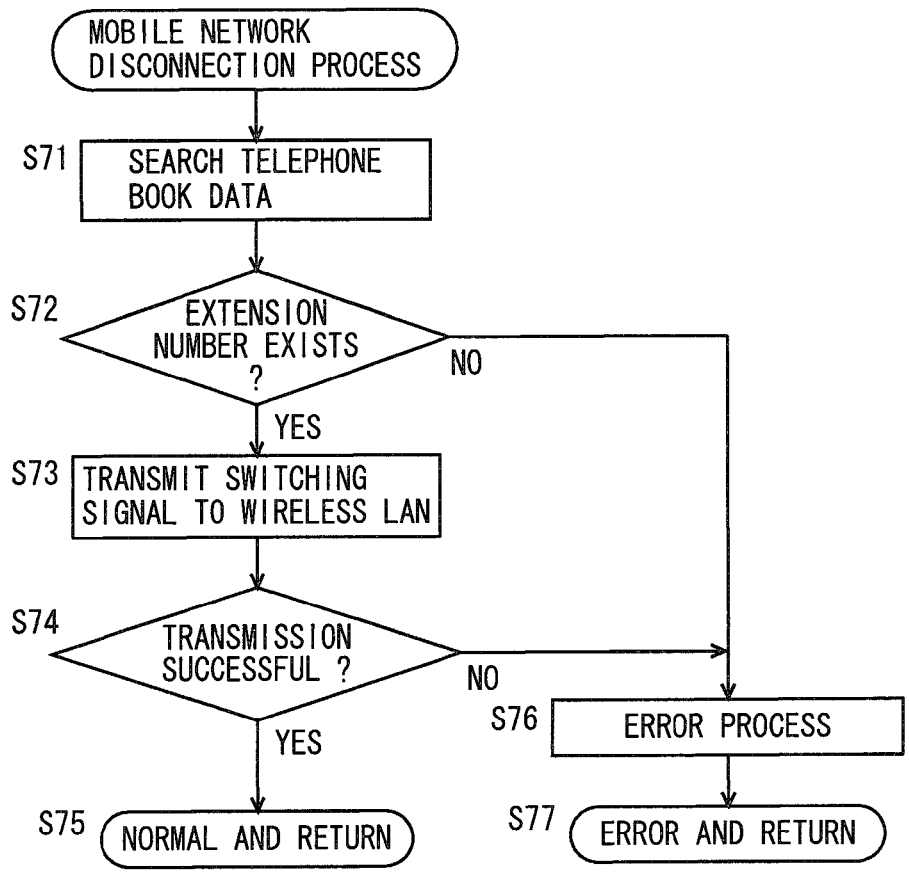
FIG. 9 is a flowchart showing an exemplary flow of a mobile network disconnection process.

FIG. 9 is a flowchart showing an exemplary flow of the mobile network disconnection process. The mobile network disconnection process is a process executed in step S29 in FIG. 5. Referring to FIG. 9, the telephone book data is searched (step S71). When the mobile network disconnection process is executed, mobile phone 1 has been connected with the other party's mobile phone via the mobile network until then. Therefore, using as a key the mobile phone number allotted to the other party's mobile phone in the mobile network, the extension number allotted in the wireless LAN is obtained. Specifically, using as a key the mobile phone number allotted to the other party's mobile phone in the mobile network, the telephone book data stored in flash ROM 31 is searched and the telephone book data is then extracted.

In the next step S72, it is determined whether or not the extension number allotted to the other party's mobile phone in the wireless LAN exists. Specifically, it is determined whether or not the telephone book data including the mobile phone number is extracted, and if extracted, it is then determined whether or not an extension number is defined in the extracted telephone book data. If the telephone book data is not extracted, the process proceeds to step S76. If the telephone book data is extracted, and if an extension number is defined in the extracted telephone book data, the process proceeds to step S73, and if an extension number is not defined, the process proceeds to step S76.

In step S73, a switching signal is transmitted to the wireless LAN. Specifically, an email including a switching signal is generated, and the email is transmitted to the email address defined in the telephone book data extracted in step S72. The switching signal includes an instruction to allow the other party's mobile phone to disconnect the line established via the mobile network and make a transition to a standby state. Since the switching instruction is transmitted before a call is originated to the other party's mobile phone with the extension number via the wireless LAN, the other party's mobile phone does not stay in the state in which the line established via the mobile network is connected and enters the standby state in which it can respond to the next outgoing call originated by mobile phone 1.

In the next step S74, it is determined whether or not transmission of the switching signal is successful. If the transmission is successful, the process proceeds to step S75, and if the transmission is failed, the process proceeds to step S76. In step S75, the return value is set to "normal," and the process returns to the call process.

In step S76, an error process is executed, and the process proceeds to step S77. If an email cannot be transmitted, a line for a call cannot be established in the wireless LAN, and the call is therefore ended. The error process is a process of displaying a message on LCD 15 to notify the user that a call cannot be established. In step S77, the return value is set to "error message," and the process returns to the call process.

On the other hand, in step S11, it is determined whether or not an incoming call is accepted. If an incoming call is accepted, an incoming call process is executed (step S12), and if an incoming call is not accepted, the process returns to step S03.

Figure 10:
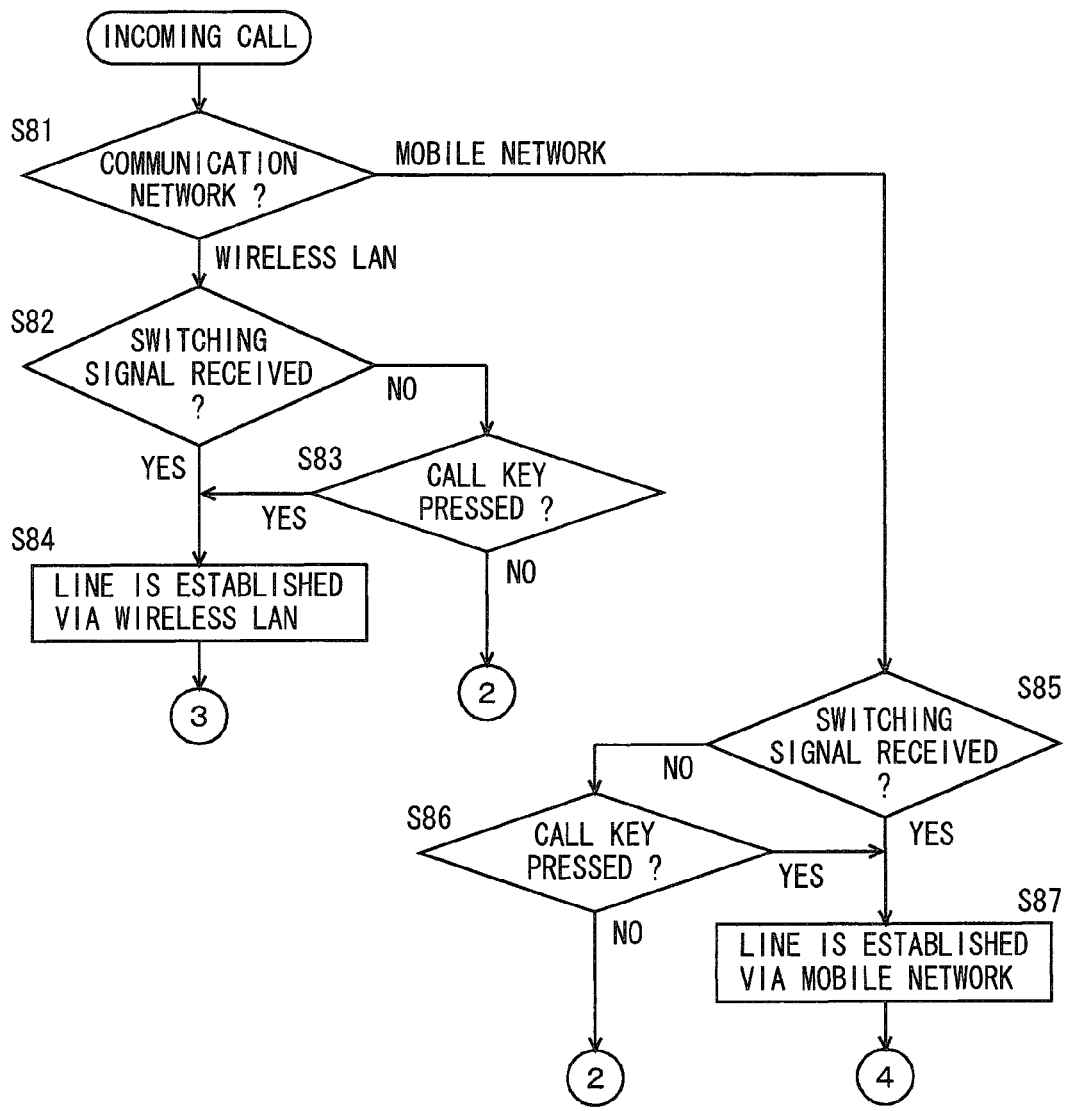
FIG. 10 is a flowchart showing an exemplary flow of an incoming call process.

FIG. 10 is a flowchart showing an exemplary flow of the incoming call process. The incoming call process is a process of connecting a line for a call in response to detection of an originated call (incoming call) from the other party. In step S81, a communication network having an incoming call is determined. If the wireless LAN circuit detects an incoming call, the process proceeds to step S82, and if radio circuit 22 detects an incoming call, the process proceeds to step S85. In step S82, it is determined whether or not wireless LAN circuit 23 receives a switching signal in step S27 of the call process shown in FIG. 5. If the incoming call (reception of a connection request) is from the mobile phone that has transmitted the switching signal received by wireless LAN circuit 23 in step S27, the process proceeds to step S84, and if not, the process proceeds to step S83. In step S83, it is determined whether or not the call key of operation keys 14 is pressed. If a press on the call key is detected, the process proceeds to step S84, and if not, the process returns to step S03 of the call process. In step S84, wireless LAN circuit 23 is allowed to establish a line. Accordingly, a call can be established by wireless LAN circuit 23.

In step S85, it is determined whether or not radio circuit 22 receives a switching signal in step S09 of the call process shown in FIG. 5. If the incoming call (reception of a connection request) is from the mobile phone that has transmitted the switching signal received by radio circuit 22 in step S09, the process proceeds to step S87, and if not, the process proceeds to step S86. In step S86, it is determined whether or not the call key of operation keys 14 is pressed. If a press on the call key is detected, the process proceeds to step S87, and if not, the process returns to step S03 of the call process. In step S87, radio circuit 22 is allowed to establish a line. Accordingly, a call can be established by radio circuit 22.

If an incoming call from the mobile phone that has transmitted a switching signal is detected after wireless LAN circuit 23 receives the switching signal, a line for a call is automatically connected. On the other hand, if an incoming call from the mobile phone that has transmitted a switching signal is detected after radio circuit 22 receives the switching signal, a line for a call is automatically connected. Therefore, the user needs not perform an operation for an incoming call, for example, an operation for switching the communication networks, an operation for responding to an incoming call, and the like, thereby simplifying the operation.

As described above, mobile phone 1 in the present embodiment stores the telephone book data in which the name of the user of the other party of a call (user identification information) is associated with a mobile phone number and an extension number. When communication cannot be maintained during establishment of a line via the wireless LAN with the mobile phone carried by the other party of the call, the telephone book is searched, and the mobile phone number that is related to the user identification information of the called user and corresponds to the mobile network is extracted so that a call is originated to the other party's mobile phone with the mobile phone number. Therefore, even when a call cannot be maintained with the other party's mobile phone via the wireless LAN, a call is automatically originated via the mobile network, so that a line for a call is automatically established. This eliminates the need for an operation of switching from the wireless LAN to the mobile network and an operation of originating a call with a mobile phone number, thereby improving convenience. As a result, the operation during a call can be simplified.

In addition, when communication cannot be maintained during establishment of a line via the mobile network with the mobile phone owned by the other party of a call, the telephone book is searched, and the extension number that is related to the user identification information of the called user and corresponds to the wireless LAN is extracted so that a call is originated to the other party's mobile phone with the extension number. Therefore, even when a call cannot be maintained with the other party's mobile phone via the mobile network, a call is automatically originated via the wireless LAN, so that a line for a call is automatically established. This eliminates the need for an operation of switching from the mobile network to the wireless LAN and an operation of originating a call with an extension number, thereby improving convenience.

In addition, when communication cannot be maintained during establishment of a line via the wireless LAN, the telephone book data is searched, and the message address that is related to the user identification information of the called user and is allotted in the mobile network is extracted, and before a call is originated with the mobile phone number, a switching signal is transmitted to the message address. Since a call is originated to the mobile phone number after the switching signal is transmitted, the mobile phone of the other party that has received the switching signal can enter a standby state and can automatically respond to the originated call from mobile phone 1. Therefore, it is possible to smoothly switch from communication using the line of the mobile network to communication using the line of the wireless LAN, so that the switching waiting time can be shortened.

In addition, when communication cannot be maintained during establishment of a line via the mobile network, the telephone book data is searched, and the email address that is related to the user identification information of the called user and is allotted in the wireless LAN is extracted, and before a call is originated with the extension number, a switching signal is transmitted to the email address. Since a call is originated to the extension number after the switching signal is transmitted, the mobile phone of the other party that has received the switching signal can enter a standby state and can automatically respond to the originated call from mobile phone 1. Therefore, it is possible to smoothly switch from communication using the line of the wireless LAN to communication using the line of the mobile network, so that the switching waiting time can be shortened.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication terminal comprising:
    different kinds of communication portions;
    a storage portion to store an address table in which target identification information for identifying a target to communicate and multiple pieces of access information respectively corresponding to said different kinds of communication portions are associated with each other;
    an extraction portion to search said address table, when a first communication portion of said different kinds of communication portions becomes incommunicable during communication with a communication target, and to extract access information which is related with said target identification information for identifying said communication target and corresponds to a second communication portion different from said first communication portion of said different kinds of communication portions; and
    a reconnection portion to transmit a connection request to said communication target by said second communication portion using said extracted access information, wherein
    said address table further associates said target identification information with multiple pieces of address information respectively corresponding to said different kinds of communication portions for transmitting data,
    said extraction portion includes an address information extraction portion to search said address table and extract address information which is related with said target identification information for identifying said communication target and corresponds to a second communication portion different from said first communication portion of said different kinds of communication portions, and
    said communication terminal further comprises a switch notification portion to transmit switching information indicating switching to said communication target by said second communication portion using said extracted address information before said reconnection portion transmits said connection request.

2. The communication terminal according to claim 1, further comprising a disconnection portion to disconnect communication by said first communication portion when said second communication portion receives said switching information from said communication target during communication with said communication target by said first communication portion.

3. The communication terminal according to claim 2, further comprising an automatic incoming call portion to start communication by said second communication portion when said second communication portion receives said connection request from said communication target after said disconnection portion disconnects communication.

4. The communication terminal according to claim 1, wherein
    each of said different kinds of communication portions includes
    a radio field intensity detection portion to detect a radio field intensity of a radio wave received during communication and
    a communication state detection portion to detect whether or not communication cannot be maintained, based on said detected radio field intensity.

5. The communication terminal according to claim 1, wherein
    said switching information includes an instruction to disconnect communication by said first communication portion and transition to a standby state.

6. A communication method executed in a communication terminal,
    said communication terminal including;
    different kinds of communication portions; and
    a storage portion to store an address table in which target identification information for identifying a target to communicate and multiple pieces of access information respectively corresponding to said different kinds of communication portions are associated with each other,
    said communication method comprising the steps of:
    searching said address table, when a first communication portion of said different kinds of communication portions becomes incommunicable during communication with a communication target, and extracting access information which is related with said target identification information for identifying said communication target and corresponds to a second communication portion different from said first communication portion of said different kinds of communication portions; and
    transmitting a connection request to said communication target by said second communication portion using said extracted access information, wherein
    said address table further associates said target identification information with multiple pieces of address information respectively corresponding to said different kinds of communication portions for transmitting data,
said extracting step includes the step of searching said address table and extracting address information which is related with said target identification information for identifying said communication target and corresponds to a second communication portion different from said first communication portion of said different kinds of communication portions, and
said communication method further comprises the step of transmitting switching information indicating switching to said communication target by said second communication portion using said extracted address information before said connection request is transmitted.

7. The communication method according to claim 6, further comprising the step of disconnecting communication by said first communication portion when said second communication portion receives said switching information from said communication target during communication with said communication target by said first communication portion.

8. The communication method according to claim 7, further comprising the step of starting communication by said second communication portion when said second communication portion receives said connection request from said communication target after communication is disconnected in said disconnecting step.

9. The communication method according to claim 6, further comprising the steps of:
detecting a radio field intensity of a radio wave received by each of said different kinds of communication portions during communication; and
detecting whether or not communication cannot be maintained, based on said detected radio field intensity.

10. The communication method according to claim 6, wherein
said switching information includes an instruction to disconnect communication by said first communication portion and transition to a standby state.

11. A non-transitory computer-readable recording medium, storing thereon a communication program executed in a computer which controls a communication terminal,
said communication terminal including:
different kinds of communication portions; and
a storage portion to store an address table in which target identification information for identifying a target to communicate and multiple pieces of access information respectively corresponding to said different kinds of communication portions are associated with each other,
said communication program comprising the steps of:
searching said address table, when a first communication portion of said different kinds of communication portions becomes incommunicable during communication with a communication target, and extracting access information which is related with said target identification information for identifying said communication target and corresponds to a second communication portion different from said first communication portion of said different kinds of communication portions; and
transmitting a connection request to said communication target by said second communication portion using said extracted access information, wherein
said address table further associates said target identification information with multiple pieces of address information respectively corresponding to said different kinds of communication portions for transmitting data,
said extracting step includes the step of searching said address table and extracting address information which is related with said target identification information for identifying said communication target and corresponds to a second communication portion different from said first communication portion of said different kinds of communication portions, and
said communication program further comprises the step of transmitting switching information indicating switching to said communication target by said second communication portion using said extracted address information before said connection request is transmitted.

12. The non-transitory computer-readable recording medium according to claim 11, said communication program further comprising the step of disconnecting communication by said first communication portion when said second communication portion receives said switching information from said communication target during communication with said communication target by said first communication portion.

13. The non-transitory computer-readable recording medium according to claim 12, said communication program further comprising the step of starting communication by said second communication portion when said second communication portion receives said connection request from said communication target after communication is disconnected in said disconnecting step.

14. The non-transitory computer-readable recording medium according to claim 11, said communication program further comprising the steps of:
detecting a radio field intensity of a radio wave received by each of said different kinds of communication portions during communication; and
detecting whether or not communication cannot be maintained, based on said detected radio field intensity.

15. The non-transitory computer-readable recording medium according to claim 11, wherein
said switching information includes an instruction to disconnect communication by said first communication portion and transition to a standby state.

* * * * *